US006719245B2

United States Patent
Wagner

(10) Patent No.: US 6,719,245 B2
(45) Date of Patent: Apr. 13, 2004

(54) CONTROL AND ENERGY SUPPLY SYSTEM FOR AT LEAST TWO AIRCRAFT SEATS

(75) Inventor: Wolfgang Wagner, Friedrichshaten (DE)

(73) Assignee: Recaro Aircraft Seating GmbH & Co. KG (DE)

( * ) Notice: Subject to any disclaimer, the term of this patent is extended or adjusted under 35 U.S.C. 154(b) by 0 days.

(21) Appl. No.: 10/333,276
(22) PCT Filed: Mar. 2, 2002
(86) PCT No.: PCT/DE02/00782
§ 371 (c)(1),
(2), (4) Date: Jan. 16, 2003
(87) PCT Pub. No.: WO02/076825
PCT Pub. Date: Oct. 3, 2002

(65) Prior Publication Data
US 2004/0031882 A1 Feb. 19, 2004

(30) Foreign Application Priority Data
Mar. 28, 2001 (DE) .......................................... 101 15 523

(51) Int. Cl.⁷ .............................................. B64D 11/00
(52) U.S. Cl. ................................. 244/118.5; 244/118.6; 244/122 R; 297/217.3
(58) Field of Search ........................... 244/118.5, 118.6, 244/122 R; 297/217.3

(56) References Cited

U.S. PATENT DOCUMENTS

| 6,194,853 B1 | * | 2/2001 | Tual et al. ................... 318/266 |
| 6,601,798 B2 | * | 8/2003 | Cawley ................... 244/118.6 |
| 6,644,593 B2 | * | 11/2003 | Lambiaso ................ 244/118.5 |
| 2003/0090133 A1 | * | 5/2003 | Nathan et al. ............. 29/217.3 |

* cited by examiner

Primary Examiner—Woodrow Eldred
(74) Attorney, Agent, or Firm—Greer, Burns & Crain, Ltd

(57) ABSTRACT

In a control and energy supply system for the drive units and control units for at least two, preferably adjacent, aircraft seats, all system components are interconnected via a data bus, so that the control system of the one seat is informed of what is happening to the other seat. The servomotors of the seats can be supplied with power via two separate networks. System failure caused by loose or disconnected plug type connections, cable breakage, short circuits or a failed control unit can be avoided by said redundancy concept.

22 Claims, 3 Drawing Sheets

CONTROL AND ENERGY SUPPLY SYSTEM FOR AT LEAST TWO AIRCRAFT SEATS

The present invention relates to a control, energy supply management and "power sharing" concept for the drives and control units in aircraft seats.

In control units, drive units and other configuration changing elements of an aircraft seat, the following serious faults may arise: Loose or disconnected plug type or other connectors, cable breakage, short circuits to ground or to another supply line, failed control units and failure of drive units or input devices and control elements, respectively, which may e.g. be pushbuttons, switches, chip card readers, possibly with a display.

It is the object of the present invention to indicate a system in which the function of the control units, drive units or other configuration changing elements is ensured.

This object is achieved according to the invention by the features of the independent patent claims.

Advantageous developments of the invention are characterized in the dependent claims.

The invention provides a redundancy concept which is fault tolerant. Advantageously, the concept is supplemented by a "power sharing and management" system for adaptation to the corresponding control demands, which constitutes a very essential and independent inventive idea.

The system according to the invention consists of a number of drive units, control units and monitoring units that are adapted to the respective aircraft seat, said elements of at least two, preferably adjacent, aircraft seats being preferably arranged in the form of a bus topology or ring topology. The system, however, may also comprise the elements of three or more aircraft seats.

The bus topology may be a ring system or also a linear system. Dual buses which are laid in anti-parallel fashion are preferably used in linear structures.

Another, e.g. discrete, arrangement of the input and control elements is also possible.

The control units and the drive units of the group of seats consisting of two or more aircraft seats are equipped with local intelligence which permanently transmits the configuration to the monitoring system parts, the units being e.g. equipped with suitable sensors. The control units have a bus controller. The bus controllers of at least two control units are informed through the configuration reports about all processes within the system.

The control unit and the drive units of an aircraft seat are connected to the control unit and the drive units of at least one further aircraft seat, preferably via a bus topology or ring topology, in such a way that each drive unit is controllable via two connections by the associated two control units. When the standard bus connection between a drive unit and the associated control unit of the aircraft seat is interrupted, this is noticed via the local intelligence of the system components and reported to the other control unit through the bus connection of which the affected control unit is then controlled.

Moreover, according to the invention each drive unit of the two or more aircraft seats can be supplied with power by at least two power supply units. When the local intelligence in the system components detects that the standard current path of an aircraft seat is interrupted, as is the case with a disconnected plug-type or other connection and with cable breakage in the power supply, this is reported via the bus system to the two control units, whereupon the control operation is performed such that the current is taken over from the partner system. The current is preferably calculated in advance to make sure that the partner supply is not overloaded.

Preferably, the power supply lines are only supplied with power in case of need. This means that in case of a short circuit there is first of all no reaction. However, the control means (CBIT=Continuous Built-in Test) installed in the control unit supplies the supply lines with current at intervals for a short period of time of e.g. 100 ms to feed e.g. the electronic system of the drive units, but also for checking whether there is a short circuit in the line system. Upon detection of a short circuit, the alternative power supply of the partner system is switched to.

Alternatively, there may be a constant current monitoring, and when a limit is exceeded, there will be a switching-off operation.

In accordance with the above description the presence of an unintended external supply e.g. from the 28-V onboard network of the aircraft can be detected. In this case the system parts are instructed to react only to the partner supply.

In case of a short circuiting to ground or to the supply of the bus system, the bus communication is interrupted. This will be noticed immediately, and the partner system will be switched to.

According to the present invention the failure of a control unit can also be compensated for. The status of each control unit and the demands made on the control task are exchanged between the control units. The status is here compiled and communicated on the basis of the CBIT. In the absence of plausible information from one control unit, the other control unit takes over the tasks of the partner. The "power management" in the control unit ensures that the power supply is not overloaded. If only the control unit has failed, the power supply can still be exploited.

Failure of an individual drive unit or a control element cannot be ruled out. Since these devices are in general not dual-redundant, such a failure must be tolerated. Manual feedback means are provided for such purposes in the drive units and the actuator systems, respectively. In the case of the input device and the control element, respectively, the device of the partner can however be used. The function of all of the other system components is not affected by such faults.

In the area of the aircraft seats a plurality of devices must be supplied with current. These are e.g. a video entertainment system, a telephone, and an internet access, the supply for a personal computer (laptop) and reading light as well as seat control.

Due to the number of aircraft seats the current per seat is bound to be limited. The present invention exploits the cross link between the seats to offer more power to the individual seat than can normally be obtained under worse case conditions. Since the instantaneously consumed current of the partner seat(s) is known, such an increase in power can be realized via the connection lines.

Moreover, according to the invention less important supplies are automatically switched off in heavy-duty cases. A special case is the demand to move the seat from all configurations into the landing configuration within 15 seconds. Calculations show that the power offered is not sufficient in such a case.

The present invention offers the possibility that unnecessary consumers are first switched off. This may e.g. be the reading light, video or personal computer.

In addition, according to the invention the partner system (s) is(are) also queried as to which amounts of current can be provided for support. In the case of such an "emergency query", the unnecessary consumers are also switched off in the partner system.

According to the present invention the predetermined limits can be observed both with respect to the actuator speeds and the maximum current intensities.

Further details of the invention become apparent from the following description of preferred embodiments and from the drawing, in which.

Figure 1:
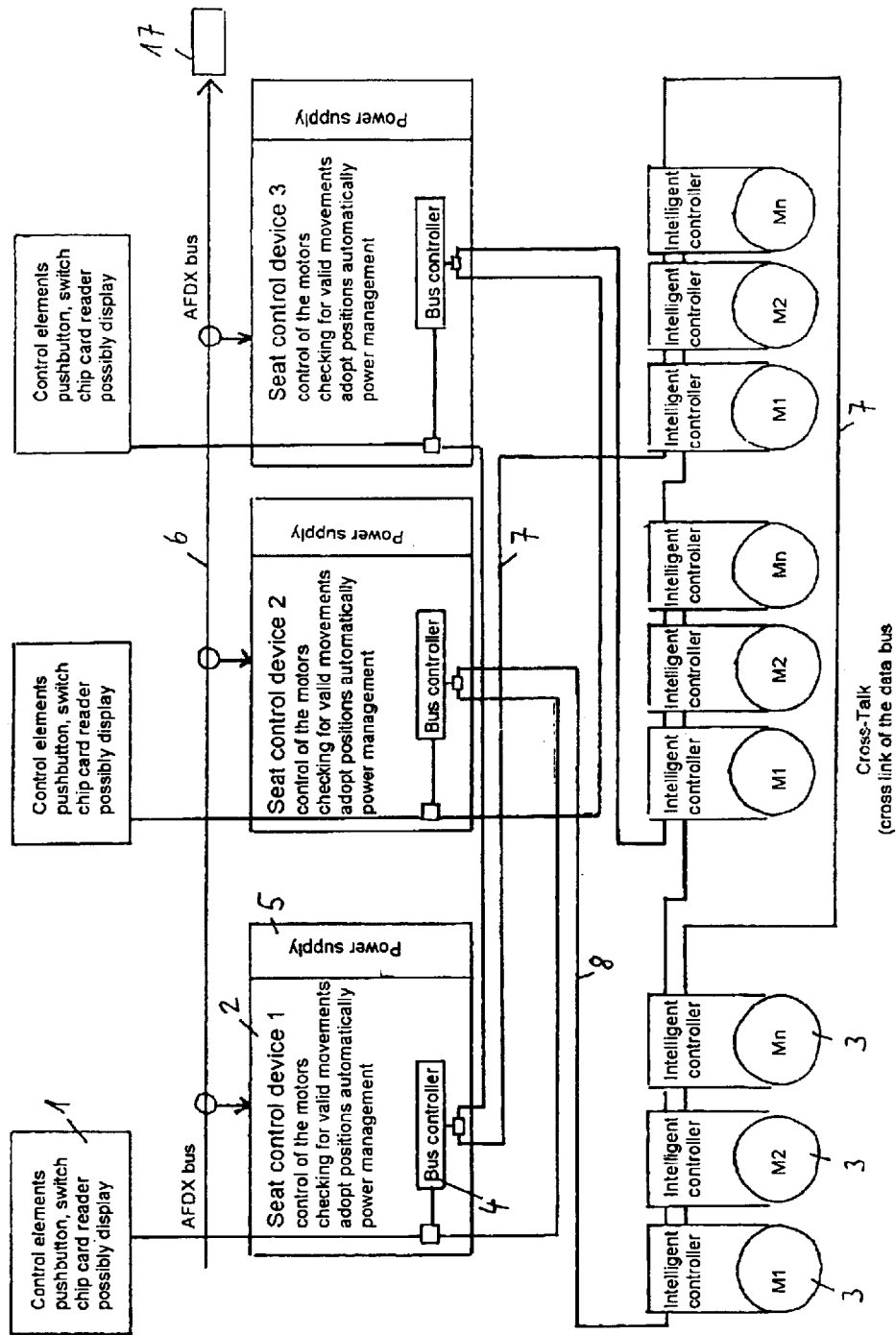
FIG. 1 shows a bus system comprising the elements of three aircraft seats.

In the system shown in FIG. 1, the elements of three aircraft seats are interconnected via a data bus. Each aircraft seat includes a control element 1, a seat control device 2 and three drive or actuator elements 3.

The control elements may e.g. be pushbuttons, switches and chip card readers.

The seat control devices 2 serve to control the servomotors 3, they check for valid movements, automatically adopt positions and satisfy a "power management".

Each seat control device 2 has a bus controller 4. Moreover, each control device 2 includes a power supply 5.

Figure 2:
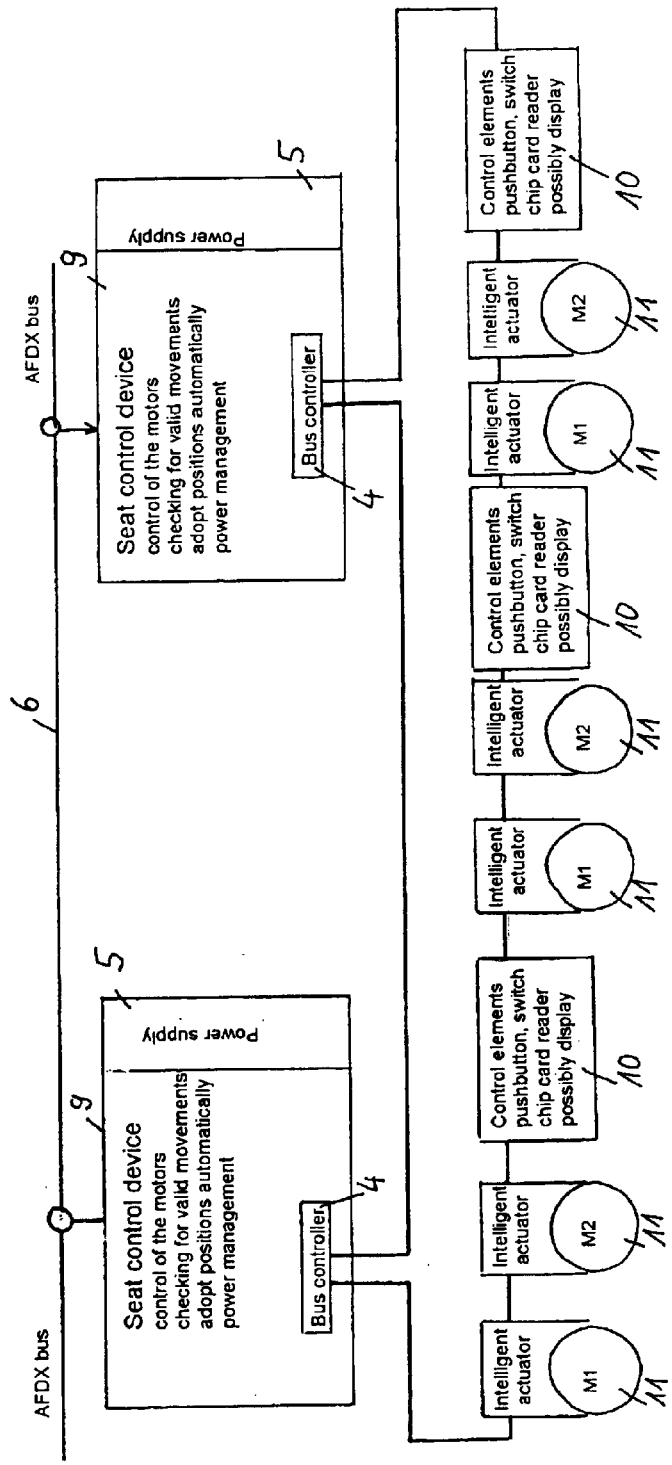
FIG. 2 shows a ring system.

The AFDX bus is marked by reference numeral 6 in FIGS. 1 and 2.

The servomotors 3 of the left seat group in FIG. 1 can be controlled via the bus connection 7 by the control device 2 belonging to said seat (in the figure the control device is positioned above the servomotors 3). When this is not possible, for instance because of a disconnected plug type connector or because of cable breakage, the servomotors 3 are controlled by the control device that is the central one in the illustration, via the bus connection 8 from the other side.

FIG. 2 shows a data ring bus system with two control devices 9, three control elements 10, and three pairs of servomotors 11 of three adjacent aircraft seats. The control elements are here included in the ring bus.

Like in the case of the actuator elements 3 of FIG. 1, the servomotors 11 are again intelligent actuators which constantly transmit the configuration to the control devices.

Figure 3:
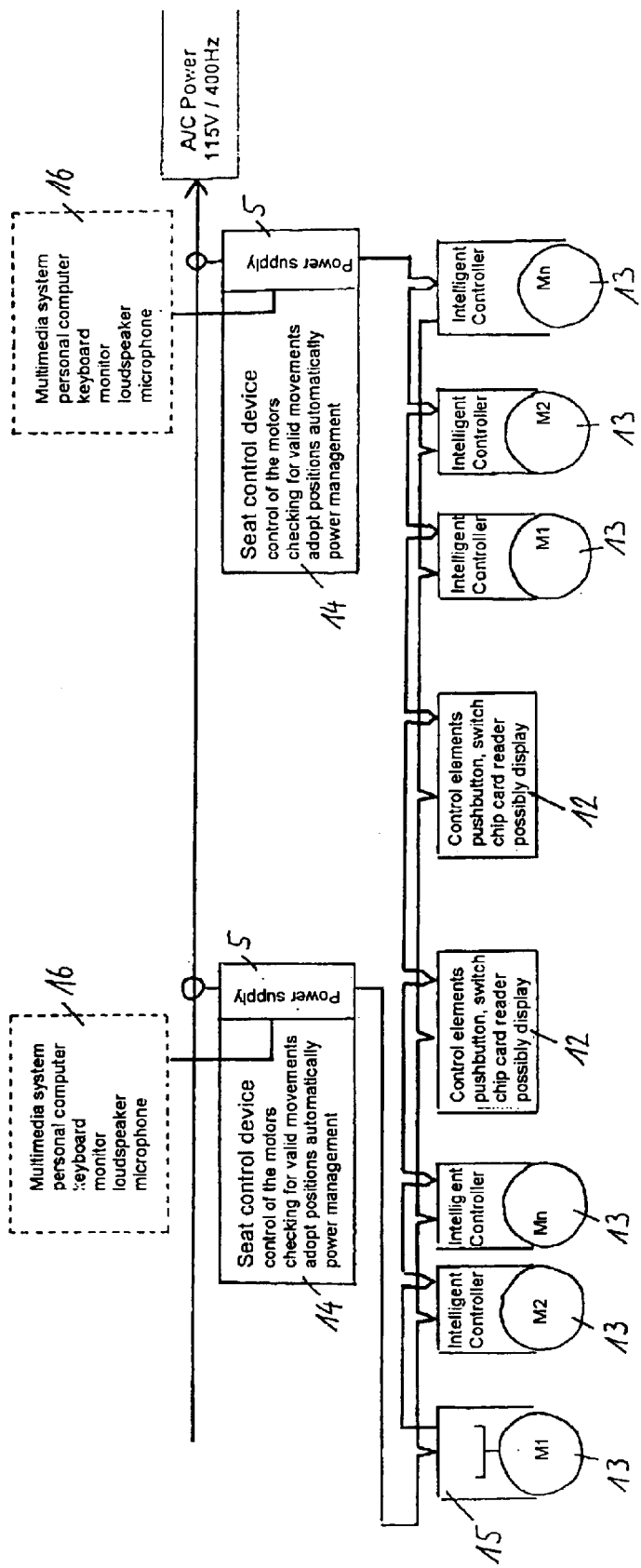
FIG. 3 shows the power supply of a double-seat system.

FIG. 3 shows the power supply of a double-seat arrangement with a control element each, three servomotors 13 and one seat control device 14 each.

All servomotors 14 and the control elements 12 can be supplied with power via two separate power supply units that are controlled either by the control device shown at the left or right side in the figure. As outlined in the servomotor 14 at the left side in the figure, the servomotors 13 have a switch 15 with which they are connectable either to the one or the other circuit. For the same purpose decoupling diodes may e.g. also be provided. The switches or the like can also be arranged in the control elements.

The power supply 5 of the control devices 14 may also feed a multimedia system, a personal computer, a keyboard, monitor, loudspeaker and microphone, which in the figure are marked with reference numeral 16 on the whole.

With the help of a software contained in the control unit 14 or by a corresponding wiring, the servomotors 13 and the control elements 12 are assigned to the respective aircraft seat. This means that the right unit knows about the system parts pertaining to it and is thus also aware which ones belong to the left partner. Since all system parts have, however, a common bus topology, the respective control system is also informed about what is just happening at the other side.

According to a further essential aspect of the invention, all inconsistencies and faults, their type and exact location can be detected and transmitted by a bus system extending through all seats to a central overall maintenance system, which is marked in FIG. 1 with reference numeral 17. All faults arising at the seats can thus be queried centrally.

What is claimed is:

1. A control and energy supply system for drive units and control units of at least two, aircraft seats, characterized in that the control unit and the drive units of one aircraft seat are connected to the control unit and the drive units of at least one further aircraft seat via a data line means, that each drive unit can be supplied with power by at least two power supply units, and that an interruption in the normal data line connection of a seat is detected and reported via the data line means to the control unit of a further aircraft seat, and control and configuration report are carried out via a partner system.

2. A control and energy supply system for drive units and control units of at least two, aircraft seats, characterized in that the control unit and the drive units of an aircraft seat are connected to the control unit and the drive units of at least one further aircraft seat via a data line means, that each drive unit can be supplied with power by at least two power supply units, and that an interruption in the normal current path of an aircraft seat is detected and reported via the data line means to the control units of said aircraft seat and a further aircraft seat, and the control operation is then carried out such that the current is taken from the other power supply unit.

3. A control and energy supply system for drive units and control units of at least two, aircraft seats, characterized in that the control unit and the drive units of an aircraft seat are connected to the control unit and the drive units of at least one further aircraft seat via a data line means, that each drive unit can be supplied with power by at least two power supply units, and that upon detection of a short circuit or of an unintended external supply the power supply of the adjacent system is switched to.

4. A control and energy supply system for the drive units and control units of at least two, aircraft seats, characterized in that the control unit and the drive units of an aircraft seat are connected to the control unit and the drive units of at least one further aircraft seat via a data line means, that each drive unit can be supplied with power by at least two power supply units, and that the control units exchange their status and the demands on their control tasks between each other, and in the absence of plausible information from a control unit the other control unit assumes the task thereof.

5. A control and energy supply system according to claim 1, wherein the control units and the drive units are equipped with local intelligence permanently transmitting a configuration to monitoring system parts.

6. A control and energy supply system according to claim 1, wherein the data line means has a bus or ring architecture.

7. A control and energy supply system according to claim 1, wherein each control element of the aircraft seats can also be supplied by said at least two power supply units.

8. A control and energy supply system according to claim 7, wherein upon failure of a control element the control element of the other aircraft seat can be used.

9. A control and energy supply system according to claim 1, wherein a common maximum current is provided for the at least two aircraft seats.

10. A control and energy supply system according to claim 9, wherein, when the maximum current is exceeded, predetermined electric devices are automatically switched off.

11. A control and energy supply system according to claim 2, wherein the control units and the drive units are equipped with local intelligence permanently transmitting a configuration to monitoring system parts.

12. A control and energy supply system according to claim 2, wherein the data line means has a bus or ring architecture.

13. A control and energy supply system according to claim 2, wherein each control element of the aircraft seats can also be supplied by said at least two power supply units.

14. A control and energy supply system according to claim 2, wherein a common maximum current is provided for the at least two aircraft seats.

15. A control and energy supply system according to claim 3, wherein the control units and the drive units are equipped with local intelligence permanently transmitting a configuration to monitoring system parts.

16. A control and energy supply system according to claim 3, wherein the data line means has a bus or ring architecture.

17. A control and energy supply system according to claim 3, wherein each control element of the aircraft seats can also be supplied by said at least two power supply units.

18. A control and energy supply system according to claim 3, wherein a common maximum current is provided for the at least two aircraft seats.

19. A control and energy supply system according to claim 4, wherein the control units and the drive units are equipped with local intelligence permanently transmitting a configuration to monitoring system parts.

20. A control and energy supply system according to claim 4, wherein the data line means has a bus or ring architecture.

21. A control and energy supply system according to claim 4, wherein each control element of the aircraft seats can also be supplied by said at least two power supply units.

22. A control and energy supply system according to claim 4, wherein a common maximum current is provided for the at least two aircraft seats.

* * * * *